July 31, 1962 P. M. KNAPP 3,047,723
PHOTOELECTRIC HIT DETECTOR SYSTEM
Filed Dec. 31, 1958 3 Sheets-Sheet 1

INVENTOR
PHILLIP M. KNAPP
BY Thomas J. Holden
ATTORNEY

July 31, 1962  P. M. KNAPP  3,047,723
PHOTOELECTRIC HIT DETECTOR SYSTEM
Filed Dec. 31, 1958  3 Sheets-Sheet 2

INVENTOR
PHILLIP M. KNAPP
BY Thomas J. Holden
ATTORNEY

July 31, 1962  P. M. KNAPP  3,047,723
PHOTOELECTRIC HIT DETECTOR SYSTEM
Filed Dec. 31, 1958  3 Sheets-Sheet 3

INVENTOR
PHILLIP M. KNAPP
BY Thomas J. Holden
ATTORNEY

United States Patent Office 3,047,723
Patented July 31, 1962

3,047,723
PHOTOELECTRIC HIT DETECTOR SYSTEM
Phillip M. Knapp, Timonium, Md., assignor to Aircraft Armaments, Inc., Baltimore, Md., a corporation of Maryland
Filed Dec. 31, 1958, Ser. No. 784,155
8 Claims. (Cl. 250—222)

This invention relates to a target system for use in marksmanship training, and more particularly to a system of a class including a target device for detecting hits, and an evaluating means for determining the accuracy of the hits.

The need for a system of the particular class arises from an attempt to increase the rate of practice firing by eliminating the necessity for inspecting, scoring and patching a target after each practice shot. A target, which is generally paper stretched over a wooden frame, is positioned at some distance from the trainee. Heretofore, after each shot, the target is withdrawn behind a barricaded position where personnel inspect, score and patch the target. It is then placed in position for another shot. In terms of personnel exposed to hazard and time consumed inspection, scoring, patching and changing targets, the system described above is both dangerous and slow.

In efforts to improve the system of the particular class described, a system has been devised which employs photoelectric matrix detecting means for sensing the passage of a projectile within a target area to establish its spatial coordinates with respect to the frame used to generate the matrix, and evaluating means for ascribing, depending upon the target in use, a particular value to the spatial coordinates. With a photoelectric matrix, the target area is covered by one set of light beams and photoelectric cells on the X axis, and another set on the Y axis, thus dividing the target area into incremental units having sides equal to the width of the beams. A projectile, passing through an incremental area is detected by the two sets of photocells when it partially interrupts a beam on each axis and produces thereby, signals which establish the spatial coordinates of the hit. Such an improved system gives rise to a number of problems, which can be segregated into those relating to the photoelectric matrix per se, and those relating to the evaluating means for determining the accuracy of the hits.

One of the problems in a photoelectric system of the type described is that of insuring detection of a projectile. This requires the entire target area to be covered by the matrix in such a manner that any gap or "hole" between beams is smaller than the projectile in order to insure its detection by both sets of photoelectric cells upon passage through such a gap. As the projectile size decreases, this requirement dictates perfectly collimated light beams that "touch," since it is only within a region of perfect collimation that detection is assured. However, a beam with a well defined edge requires a point source of light and collimating lenses free from chromatic and spherical aberrations. The finite size of a lamp filament prevents its being a point source, the substantial chromatic and spherical abberation of inexpensive lenses prevents their achieving perfect collimation, and the finite size of the sensitive wafer of a photocell prevents its being a point receiver. While it is possible to approximate the conditions required for perfect collimation by resorting to expedients such as pin holes, monochromatic light sources, masked lenses, color compensated lenses, etc., such expedients add to the complexity and cost of an installation.

Much effort has been expended to contribute a matrix of the class described in which the use of ordinary sources, lenses and receivers of light does not adversely affect detection of small projectiles passing through the matrix, but so far as is known, no successful matrix of the class described has yet been contributed to the art, and the problems here outlined remain unsolved. It is an object of this invention to contribute a matrix of the class described, and using readily available lamps, lenses and photoelectric cells, in which imperfect collimation of each beam presents no real obstacle to the detection of small projectiles by the least number of cells.

Another problem in a photoelectric system of the type described is that of protecting the photoelectric equipment against projectile hits. This requires armoring the region around the target area containing the lamps, collimating lenses, collecting lenses and photocells, which generally are aligned with the collimated beam. Being normal to the path of projectiles, all the equipment faces the marksman. Thus, the amount of armor has heretofore been determined principally by the focal length of the lenses, and to a lesser extent by the physical size of the lenses, lamps, photocells and mounting means therefor because the focal length is generally relatively large. As the focal length of the lenses is increased to minimize spherical and chromatic aberrations, and various expedients are provided on the mounting means to facilitate collimation adjustment, the size of the frame and the amount of armor required are increased.

Much effort has been expended to contribute a mounting for the equipment of the class described in which the use of ordinary sources, lenses and detectors does not adversely affect the size of a device mounting such equipment, but so far as is known, no successful mounting of the class described has yet been contributed to the art, and the problems here outlined remain unsolved. It is therefore an object of this invention to contribute a mounting for equipment of the class described, in which a relatively large focal length for minimizing spherical aberration and an imperfect mounting of the parts present no real obstacle to having a small exposed frontal area required to be armored.

In a system of the type described in which the coordinates of a hit with respect to a target area are established, it is necessary to transfer coordinate information from the target area to a place remote therefrom where such information can be displayed and scored. To connect the output of each detecting cell to a remote indicator by a wire would require an enormous amount of wire as there is an increase in the number of incremental units of target area and in the distance between target and indicator. An alternate system would assign a different voltage to each coordinate on an ordinate. The activated coordinate would be converted to its voltage and sent via a single conductor to a remote indicator for decoding. The difficulty of this, and any other analog approach, arises in the calibration of the system since variations in line voltage, ground currents, aging of components and changes in cable length and resistance detrimentally affect the calibration and result in an unreliable system.

Much effort has been expended to contribute a means for transferring coordinate hit information from a matrix of the class described to a place remote therefrom in which an increase in the number of incremental units of target area and the distance between target area and indicator do not adversely affect the number of wires interconnecting the aforementioned points and the accuracy of the transferred information, but so far as is known, no successful transfer means of the class described has yet been contributed to the art, and the problems here outlined remain unsolved. It is therefore an object of this invention to contribute a means for transferring coordinate hit information using components requiring no calibration, in which the number of wires interconnecting a target with a remote scoring indicator is independent of the number of incremental areas into which the target is divided.

One of the problems relating to the evaluating means for determining the accuracy of the hits arises from the fact that it is desirable to adapt the photoelectric system to a plurality of types of targets. That is, it is desirable to be able to use with but one matrix, a plurality of targets such as the "A" bull target, the "B" bull target and the "E" kneeling silhouette target, each of which have definite target areas which produce scores of 2, 3, 4, 5 or 5V, depending on the location of the hit. The problem here is how to visually display the score and to switch the display from one target to another. One way to display the score would be to establish a display matrix having the same number of leads as there are incremental areas in each of the targets. A hit in a given incremental area on one of the targets would be transferred by the means described above to the display matrix for display. However, in switching targets, the leads of the display matrix would have to be switched since the same location of a hit on different targets may have different values. In a 36 x 36 target matrix, 1,296 leads at the display matrix would have to be switched each time the target is changed.

Much effort has been expended to contribute a target display and switch device of the class described in which an increase in the number of incremental target areas does not adversely affect switching from one target to another, but so far as is known, no successful selector device of the class described has yet been contributed to the art, and the problems here outlined remain unsolved. It is an object of this invention to contribute a display and switch device of the class described in which the number of leads requiring switching is independent of the number of incremental areas into which the target is divided.

As a feature of this invention whereby the objects thereof are obtained, the light beams are overlapped in such a manner that the region of perfect collimation of one beam touches and slightly overlaps that of adjacent beams. In this manner, small projectiles cannot escape detection because the target area is completely covered by perfectly collimated beams and no gaps exist.

As a feature of this invention whereby other objects thereof are obtained, the light beams are bent by mirrors so that most of the light path from source to lenses and from lenses to receiver is parallel to the path of the projectile. In this manner, the amount of armor required is determined by the width of the lenses rather than the focal length thereof.

As a feature of this invention whereby other objects thereof are obtained, stepping switches at a point remote from the target are slaved to stepping switches at the target actuated by the photocells which detect a projectile. In this manner, only two wires are required to interconnect the remote points for transferring the two ordinates of the hit.

As a feature of this invention whereby the other objects thereof are obtained, the display device is formed of a composite of the various targets such that only the various areas which change in value as the targets are changed need be switched.

The more important features of this invention have thus been outlined rather broadly in order that the detailed description thereof that follows may be better understood and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other apparatus for carrying out the several purposes of this invention. It is important, therefore, that the claims to be granted herein shall be of sufficient breadth to prevent the appropriation of this invention by those skilled in the art.

Figure 4:
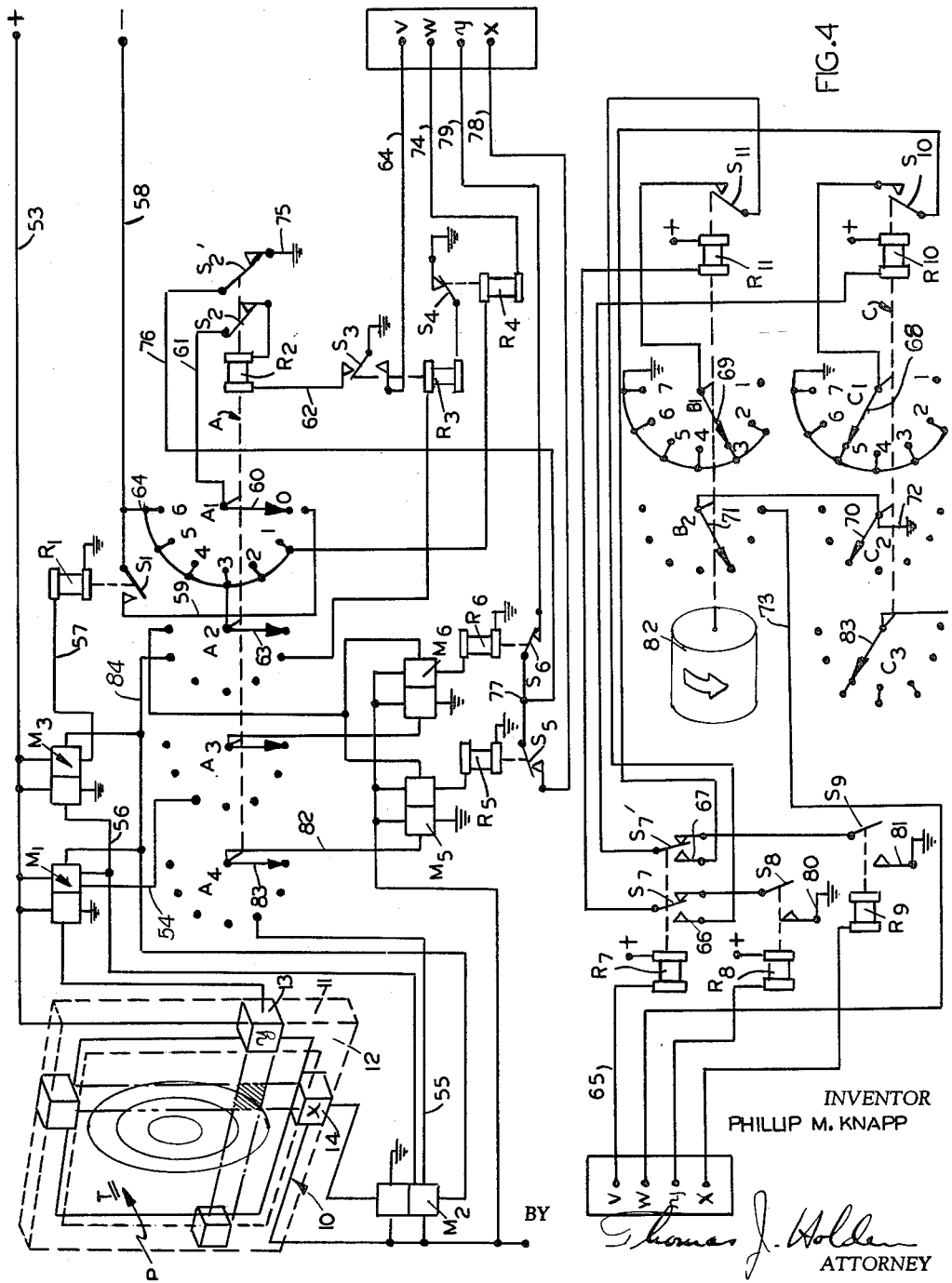
FIGURE 4 is a wiring diagram showing improved means by which coordinate information may be transferred.

Referring now more particularly to the drawing, a device embodying the present invention is shown in FIGURE 4 as a frame 10 having coordinate axes 11 and 12. These axes define a plane P which is adapted to be pierced by a projectile $p$ fired by a marksman. Photoelectric detectors 13, 14 are mounted on each axis opposite sources of light so that a projectile piercing imaginary plane T will be detected by a detector on each axis.

Figure 1:
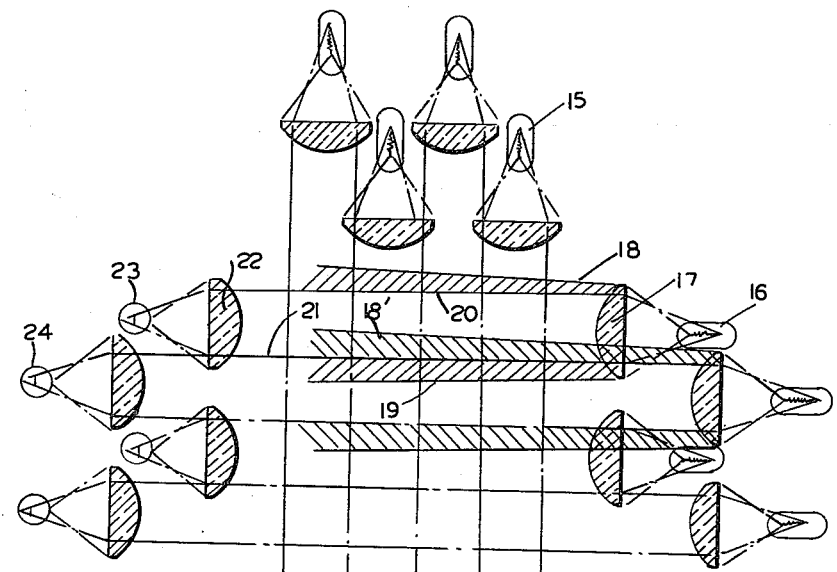
FIGURE 1 is a schematic showing of an improved photoelectric matrix.

Referring to FIGURE 1, there is shown a number of light sources 15 arranged on the X axis and a like number of sources 16 on the Y axis. Plano-convex lenses 17, which are most economical, are arranged on each side to collimate the light from sources 15, 16 to form a matrix of light beams. The effect of spherical aberrations is shown graphically in FIGURE 1 by the displacement between the foci of light rays adjacent the centerline of the lenses and the foci light rays adjacent the edges thereof. This displacement is most pronounced at $f$ numbers less than 10. While such displacement is small in comparison to the focal length, it has the effect when coupled with the finite length of the lamp filament to cause the light rays adjacent the edges of lenses 16 to tend to diverge in traveling away from the lenses as shown by lines 18, 19, and so prevent the formation of a well defined beam edge. However, in the region of the lens farther away from the edges, the light rays tend to be, for all practical purposes, parallel as shown by lines 20, 21. While the boundary between the diverging rays and the substantially parallel rays may not be as sharp as indicated, the effective beam edge can easily be determined in the manner soon to be described.

Opposite to collimating lenses 17 are collecting lenses 22 which have the same defects as lenses 17 in that the focus of a beam is a function of its displacement from the center of a lens. However, in a like manner the foci of rays of light removed from the edges are contained essentially within a relatively small foci and therein are located light sensitive photocells 23. A source 16, lenses 17 and 22, and receiver 23 constitute a photoelectric detecting unit. A projectile passing within the lines 20, 21 of a unit would be detected by cell 23 in a manner well known to those skilled in the art. However, there is no assurance that a projectile passing within the lines 18', 21, or 19, 21 will be detected since the sensitivity of cell 23 to a change in light intensity in these regions is erratic. There is a point reached where detection of a projectile is assured each time, and the location of this point with respect to displacement from lenses 17 and 22 can be plotted as a line, as shown at 20 and 21. It has been found experimentally that by overlapping the lenses by about one-eighth of their width, no holes or gaps exist in the beams. That is to say, the detection of a projectile is always assured. An overlap of this amount is enough to eliminate the possibility of a projectile passing without being detected and provides a tolerance on the adjustment required for reliable operation. A projectile passing in the region between 18' and 19 would probably trigger detector 23 and detector 24 with the probability increasing as the projectile approaches line 21. However, due to the loss of sensitivity near lines 18' and 19, there is on the average no tendency for a projectile passing through the beam associated with detector 23 and just nicking line 18' to actuate any detector but 23. If perfectly collimating lenses were used such that beams touched, a hit at the touching edge would also trigger two detectors. Hence, the result of overlapping beams is merely to make the projectile appear "larger" to the matrix than it actually is since the region which actuates two detectors becomes larger.

In placing the units on a frame, the lenses of one unit may be placed in a different plane from the lenses of an adjacent unit, so that the beams may be overlapped without the lens of one unit interfering with the source or receiver of an adjacent unit.

Figure 2:
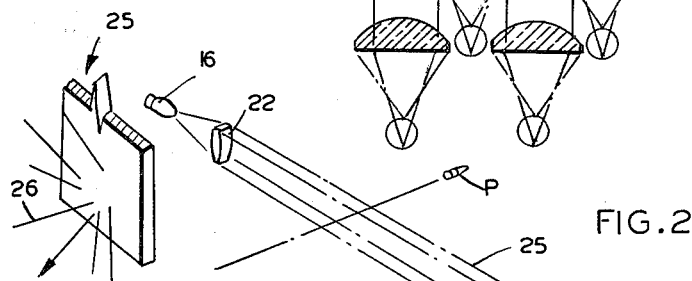
FIGURE 2 is a schematic showing of a conventional arrangement for armoring a photoelectric matrix.

A conventional incorporation of the arrangement of FIGURE 1 into frame 10 of FIGURE 4 is shown schematically in FIGURE 2. Lamp 16, collimating lens 22, collecting lens 22', and photocell 23 are axially arranged so that projectile $p$ passing through collimated light area 25 will be detected by photocell 23. To protect the equipment, armor frames 25 are provided to take near misses 26. It is apparent that the width of armor 25 is in large measure governed by the focal length of the lenses, and to a smaller extent by the thickness of the lenses and the size of the mounting for lamp 16 and photocell 23.

Figure 3:
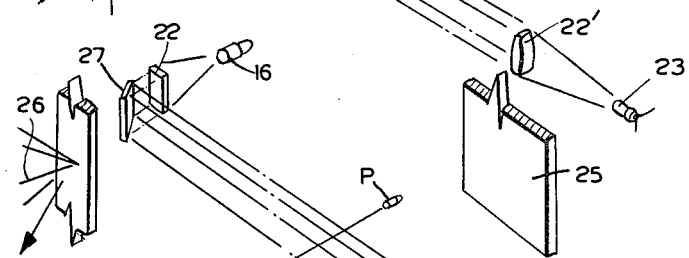
FIGURE 3 is a schematic showing of an improved arrangement for armoring a photoelectric matrix.

Referring to FIGURE 3, there is shown an arrangement to reduce the amount of armor required by using an adjustable mirror 27 to bend the light beam 90° at each end of the beam. Thus, the width of armor 25' is independent of the focal length and is governed only by the width of the lens and its mount, which results in a significant decrease in armor required to protect the equipment.

The mirror can be made adjustable so that the direction of the beam can be accurately and conveniently adjusted without requiring the moving of the lens and lamp assembly. Since this adjustment is also required at the photocell end in order to properly position the detector, the mirror at that end likewise facilitates adjustment.

For each piercing of plane P by a projectile, a set of coordinates exists which relate the pierce to the origin of the coordinate axes which can be the intersection of axes 11, 12. The displacement of the actuated detector $x$ on axis 12 from axis 11 is one coordinate and the displacement of actuated detector 13 on axis 12 from axis 11 is the other coordinate. With a target mounted within frame 10, the coordinates of the hit on the target can be ascertained from the actuated detectors. This information, when transferred to a place removed from the target area, does not alone give any indication of the score of the hit on the target since the score for a hit having given coordinates is dependent upon the value of the scoring area in which the hit occurs. This value may change as the target changes. The means to be described now is related to transferring coordinate information.

Only two detectors are shown in FIGURE 4 for purposes of clarity illustration, it being understood that each coordinate axis frame 10 has as many detectors as required to generate a matrix of sufficient size to cover the target area and of sufficient fineness to adequately cover the target with incremental areas of sensitivity. Detectors 13, 14 are of the type well known in the art requiring for operation, connection to a source of positive potential. Connected with the detectors are bi-stable multivibrators $M_1$, $M_2$ to form a complete detector unit which can be mounted within frame 10. The leads from all the detectors are brought out into a target junction box containing a self-interrupting multideck stepping switch A, bi-stable multivibrators $M_3$, $M_5$ and $M_6$, and relays $R_1$, $R_2$, $R_3$, $R_4$, $R_5$, and $R_6$. The output of this junction box is in four terminals V, W, X and Y, the first two being reset connections for resetting the indicators remote from the target, and the last two being the terminals for conveying the coordinate information from the actuated detectors. Four leads from terminals V, W, X and Y interconnect the target junction box with an indicator junction box remote from the target. The indicator junction box contains two coordinate indicating stepping switches B and C and relays $R_7$, $R_8$ and $R_9$.

When projectile $p$ enters anywhere within the crosshatched area of plane of target T, a portion of a collimated beam on each axis is interrupted and detectors 13, 14 produce signal voltages which are applied to the normally conducting side of bi-stable multivibrators $M_1$, $M_2$. Upon receipt of this voltage, conduction ceases, and the other side of the multivibrators begins to conduct. As a result, voltages appear in leads 54, 55 and remain until a trigger voltage is applied to the now conducting side of multivibrators $M_1$, $M_2$. Lead 54 is connected to stepping switch A at a terminal on deck $A_3$ corresponding to the location of detector 13 on the Y axis of frame 10. Lead 55 is likewise connected to stepping switch A at a terminal on deck $A_4$ corresponding to the location of detector 14 on the X axis. All but the first two and last two of the terminals on the switches are used for reasons which will be explained below.

Concurrent with the appearance of voltages in leads 54, 55, a pulse is produced by the switching action of each multivibrator which appears in lead 56 and is applied to the normally conducting side of another bi-stable multivibrator $M_3$. Thus, each time a projectile is sensed by the detectors, multivibrator $M_3$ is triggered by the pulse in lead 56 and the nonconducting side begins to conduct through lead 57 energizing the solenoid of relay $R_1$ and closing switch $S_1$, connected to a source of negative potential through lead 58. This potential is applied through lead 59 to terminal 1 of deck $A_1$, through movable contact arm 60, lead 61, and switch $S_2$. This potential appears across the solenoid of relay $R_2$ because lead 62 is connected to ground through switch $S_3$, and relay $R_2$ is actuated opening switch $S_2$ and advancing arm 60 to terminal 2. Switch $S_2$ now closes again but $R_2$ is not actuated because arm 63 on deck $A_2$ is then connected to the negative potential through leads 64 and 58 thereby energizing the solenoid of relay $R_3$ because switch $S_4$ connects the same to ground. Upon energization of $R_3$, switch $S_3$ is opened to connect lead 64 to ground, and relay $R_2$ cannot be actuated to move arms 60 and 63 to terminal 3 until $R_2$ is deenergized.

Lead 64 is connected to terminal $v$ on a junction box at the target. At a point remote from the target, terminal $v$ is connected by lead 65 to the solenoid of relay $R_7$ and to a source of positive potential. Thus, with $S_3$ switched to lead 64, $R_7$ is energized connecting switch $S_7$ to contact 66 and switch $S_{7'}$ to contact 67. After this occurs the solenoids of relays $R_{10}$ and $R_{11}$ are energized. This is seen by tracing the circuit from the source of positive potential at $R_{10}$ through $S_{7'}$ and 67, through interrupting switch $S_{10}$ to movable contact arm 68 on deck $C_1$ to ground. By this arrangement, stepping switches B and C step from whatever position they occupy, until movable arms 68, 69 are at terminal 1 on each switch. At that position, arms 70 and 71 are connected to ground at 72, through lead 73 to terminal $w$. Adjacent the target, terminal $w$ is connected via lead 74 to the solenoid of $R_4$. The other end of $R_4$ is connected by leads 64, 58 to a source of negative potential so that $R_4$ is energized to open switch $S_4$ thereby deenergizing $R_3$ and allowing $S_3$ to return to the position shown in the drawing. Thus $R_2$ is energized to allow stepping switch A to begin to step from initial terminal 1 all the way around to terminal 0. It is apparent then, that with the circuit above described, a projectile piercing the plane causes the stepping switch at the target to pause at terminal 1 while the stepping switches remote from the target are reset to their home position, terminal 1.

Meanwhile, the conducting sides of multivibrators $M_5$, $M_6$ are connected to ground, and the solenoids of $R_5$, $R_6$ are not energized with switches $S_5$, $S_6$ in the positions shown in the drawing. The ground connection at 75 is connected via switch $S_{2'}$ through lead 76 to junction 77. Terminal $x$ is connected by lead 78 to junction 77, and terminal $y$ by lead 79. Thus, each time $R_2$ is energized by interrupting switch $S_2$, switch $S_{2'}$ makes and breaks a ground connection at terminals $x$ and $y$. After $R_7$ is deenergized upon return of stepping switches B and C to their home position, switches $S_7$, $S_{7'}$ occupy the positions shown in the drawing. Upon connection of terminals $x$ and $y$ to ground, relays $R_8$, $R_9$ are actuated to close switches $S_8$, $S_9$, thereby connecting $R_{10}$, $R_{11}$ to grounds 80, 81. This causes switches B, C to step from terminal 1 to terminal 2. Thus, switches B, C are slaved to stepping switch A.

As contact arm 83 on deck $A_4$ engages terminal $x$ upon which is impressed the voltage from the conducting side of multivibrator $M_2$ associated with actuated detector 14 on the $x$ axis, a pulse appears in lead 82 through the movable contact 83 on deck $A_4$. This pulse causes conduction of one side of $M_5$ to cease, and energizes $R_5$ opening switch $S_5$. As this occurs, ground 75 can no longer be connected to terminal $x$ by lead 78, and $R_9$ is deenergized opening switch $S_9$ to disconnect ground 81 from $R_{10}$. Thus, switch C halts with its movable arms positioned at a displacement from its home terminal by an amount which is identical with the position the actuated terminal on deck $A_4$ occupies with respect to its initial terminal. In a like manner, switch B halts after moving through a displacement from its home terminal by an amount which is identical with the position the actuated terminal on deck $A_3$ occupies with respect to its initial position. The coordinates of a target hit can, therefore, be ascertained by the position of the movable arms on switches B, C.

As arm 63 engages terminal 5, lead 84 is connected by lead 58 to the source of negative potential. This allows a pulse to be applied to the conducting sides of multivibrators $M_1$, $M_2$, $M_3$ to cause conduction to cease thereby allowing detectors 13, 14 to be ready again to detect a projectile. Switch S opens deenergizing terminal 0 on deck A, so that as arm 60 engages this terminal, operation of switch A ceases. In addition, as arm 63 engages terminal 6, a pulse is applied to the conducting sides of multivibrators $M_5$, $M_6$ to cause conduction to cease and allow switches $S_5$, $S_6$ to close. Now the system is prepared to indicate another hit.

From the aforegoing description, it is seen that with this equipment, a projectile piercing plane P will actuate at least one detector on each axis 11, 12, with the respective displacements of the actuated detectors on one axis from the other axis being respectively the ordinate and abscissa of the pierce. Target T mounted in frame 10 will also be hit by the projectile with the coordinates of the hit being those of the pierce. Switch B remote from the target has a rotor 82 which is responsive to signals from the actuated detector on axis 11 of frame 10 for movement as described above through a displacement from its home position which is proportional to the displacement of actuated detector 13 from the origin of axes 11, 12. Switch C has deck $C_3$ with a movable contact arm 83 connected with a source of potential. Arm 83 is movable through a displacement from its home position which is proportional to the displacement of actuated detector 14 from the origin of axes 11, 12. Thus, the information available at switches B, C relates only to the coordinates of the hit.

Figure 5:
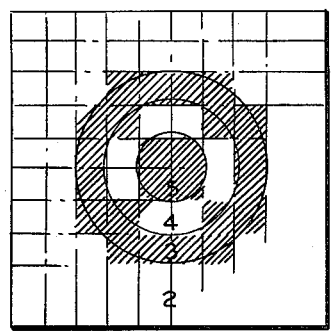
FIGURE 5 is a schematic showing of an "A" bull target.
Figure 9:
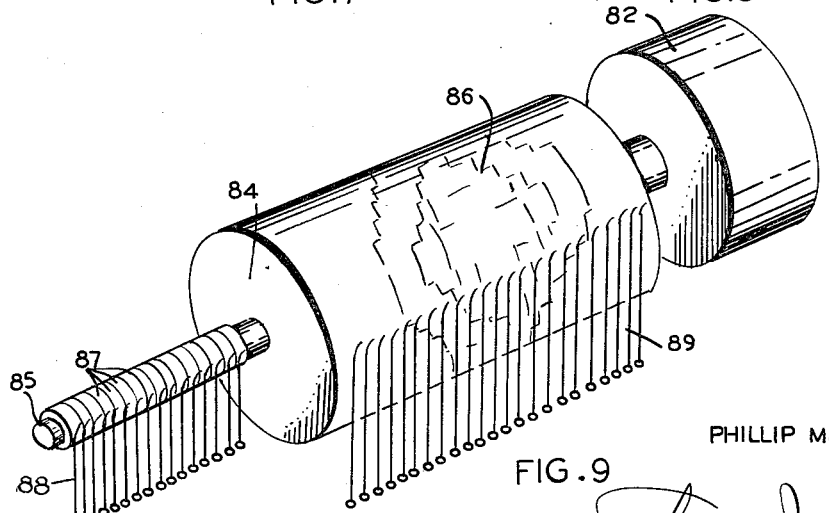
FIGURE 9 is a schematic showing of a switch used to translate coordinate information to scoring information.

A target T mounted in frame 10 is seen from FIGURE 5, for example, to have a plurality of scoring areas each with a different scoring value with the score of a projectile hit being determined by the value of the area in which the hit occurs. Areas which have the same scoring value have different coordinate values. In order to convert the coordinates of the hit, as measured by the displacements of switches B, C, into the score of the hit on the target the device shown in FIGURE 9 is used.

Attached to rotor 82 is a drum 84 mounted for rotation therewith upon shaft 85. Drum 84 has a surface 86 which has thereon a replica of the scoring areas of the target. This may be accomplished by using a copper laminate surface with the scoring pattern etched therein. The score areas on the surface are able to conduct, but are insulated electrically from each other. Mounted on shaft 85 are a series of slip rings 87 each conductively connected with the individual replica areas. There are, therefore, as many slip rings as there are areas which have different scoring values. For example, in the case of an "A" bull target as shown in FIGURE 5 there would be four different areas, each with a different scoring value. With each slip ring is a contact finger 88. Each finger may be connected to an actuatable indicator (not shown) whose value corresponds to the value of the target area represented by the replica areas. The actuatable indicator may take the form of a light indicating a number which is the score of the hit.

Mounted alongside of drum 84 are contact fingers 89. The number of fingers 89 corresponds to the number of detectors mounted on axis 12 of frame 10. They are mounted so that they contact the surface 86 in a line of contacts which lie along a generatrix of drum 84. The position of contacts 89 upon surface 86 corresponds to the position of the detectors along axis 12 upon target T. As rotor 82 turns, the line of contacts sweeps across surface 86 in increments corresponding to the detectors mounted on axis 11. However, rotor 82 halts when the actuated detector is reached, and the line of contacts then lies on surface 86 displaced from its home position by an amount proportional to the displacement of detector 13 from axis 12. By individually connecting contacts 89 with the terminals on deck $C_3$ of switch C, it is apparent that a contact 89 which corresponds to actuated detector 14 will be connected with a source of potential and will contact surface 86 at coordinates proportional to the coordinates of the hit on the target. Since the replica target areas convert coordinates to scoring values, there is an electrical connection directly to the indicator which corresponds to the score of the hit thereby causing the indicator to be actuated and the score displayed.

Figure 6:
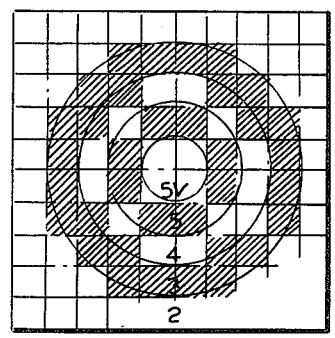
FIGURE 6 is a schematic showing of a "B" bull target.
Figure 7:
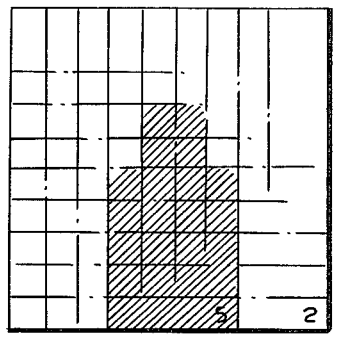
FIGURE 7 is a schematic showing of an "E" kneeling silhouette target.
Figure 8:
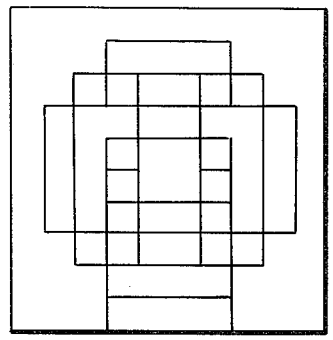
FIGURE 8 is a composite of the targets of FIGURES 5, 6 and 7 showing the areas thereof which change in value.

In training marksmen, it would be desirable to be able to use a single photoelectric matrix with a plurality of targets such as those shown in FIGURES 5 through 7. These targets may, however, have their scoring areas so located that the same coordinate hit on each target would be scored differently. A composite of these targets is shown in FIGURE 8. This composite has a plurality of areas so located and of such size that the score of a hit thereon when one target is used would be different from that when any other target were used. These are the areas which can change in value as targets of a set are switched. Thus, the number of fingers 88 required for a composite target is merely the number of scoring areas which change in value as targets are switched. Leads from terminals 88 are led to a conventional switching device where the proper leads are connected to the indicators so that any one of the targets at a time can be selected for scoring display.

What is claimed is:

1. A hit detecting system comprising a frame having coordinate axes defining a plane adapted to be pierced by a projectile, a plurality of light sources for forming a plurality of light beams, a plurality of receivers associated with said sources for forming a plurality of detecting units, detector means on each unit responsive to the interruption of its associated light beam by a projectile for producing a signal, and means mounting said units on each axis so that the piercing of said plane by said projectile will interrupt at least a portion of at least one beam on each axis whereby a signal will be produced by at least one unit on each axis.

2. A hit detecting system for a target comprising a frame having horizontal and vertical sides, a plurality of light sources mounted on said sides for forming two sets of parallel light beams defining a matrix of intersecting beams, each of said beams having at the center thereof, a perfectly collimated beam of a certain width and at the edges thereof, a region of imperfect collimation, a receiver associated with each light source and being responsive to light for producing a signal when its collimated beam is interrupted, and means mounting said sources and receivers of each of said sets so that adjacent beams on each set overlap, whereby a collimated beam on a set no more than touches an adjacent collimated beam on the same set.

3. A hit detecting system for a target comprising a frame having horizontal and vertical sides, a plurality of collimating lenses mounted on said sides, light sources mounted at the focus of said collimating lenses for forming therewith a matrix of intersecting light beams, collecting lenses associated with said collimating lenses but on the sides of said frame opposite to those upon which their associated collimating lenses are mounted for focusing said beams, a detector at the focus of each collecting lens for producing a signal whenever the collimated beam associated therewith is interrupted, means mounting said lenses such that the lines connecting the foci with their corresponding lenses lie normal to the plane of said matrix, and armor means attached to said sides for protecting said sources, lenses and detectors.

4. A system for indicating the coordinates of a hit on a target by a projectile comprising, a frame having coordinate axes defining a plane, a target, means mounting said target in said frame so that a projectile hitting the target will pierce the plane with the ordinate and abscissa of the hit being proportional to that of the pierce, individual pairs of light sources and detectors responsive to passage of a projectile therebetween to actuate the same for producing a signal, means mounting said pairs on each axis so that a projectile piercing said plane will actuate at least one pair on each axis which is respectively displaced from the other axis by an amount which is the same as the ordinate and abscissa of the pierce, ordinate and abscissa indicating means individually and independently movable from datum points for indicating respectively the ordinate and abscissa of the hit, and means responsive to the signals from the actuated pairs for causing movements of said indicating means through respective displacements which are proportional to the magnitudes of the ordinate and abscissa of the hit.

5. A system for indicating the coordinates of a hit on a target by a projectile comprising, a frame having ordinate and abscissa axes defining a plane, detector means mounted on each axis, each of said detectors having a line of sight sensitivity and having means responsive to a projectile passing therein for actuation of the same to produce a signal, means mounting said detector means so that a projectile piercing said plane will actuate at least one detector means on each axis with the respective displacements of the actuated detector means on one axis from the other axis being respectively the ordinate and abscissa of the pierce, a target, means mounting said target in said frame so that a projectile hitting the target will pierce the plane with the ordinate and abscissa of the hit being proportional to that of said pierce, a movable ordinate indicator responsive to a signal from the actuated detector means on said ordinate axis for movement through a first displacement proportional to said ordinate, a movable abscissa indicator responsive to a signal from the actuator detector means on said abscissa axis for movement through a second displacemnt proportional to said abscissa, whereby the coordinates of the hit are proportional to said first and second displacements.

6. The system of claim 5 wherein said target has a plurality of scoring areas each with a differing scoring value with the score of a projectile hit being determined by the value of the area in which the hit occurs, and there is provided means responsive to said displacements for converting the same to the score of the hit on said target.

7. The system of claim 6 wherein said last named means comprise, a surface having a replica of the scoring areas thereon, each of said replica areas being conductive but insulated from each other, means conductively connected with each individual replica area and adapted to respectively connect the same to actuatable indicators whose values correspond to the values of the target areas represented by the respective replica areas, a plurality of conductors corresponding in number to the number of detector means on said abscissa axis engaged with said replica areas in a line of contacts which are a replica of the detectors on said abscissa axis, means mounting said surface and said conductors for relative movement therebetween, means responsive to the displacement of said ordinate indicator for positioning said line of contacts on said replica areas in a line corresponding to the line of sight of the actuated detector means on said ordinate axis, and means responsive to the displacement of said abscissa indicator for connecting the contactor corresponding to the actuated detector means on said abscissa axis to a power source whereby a conductive path is established from said power source to the actuatable indicator whose value corresponds to the value of the hit on the target.

8. A system for indicating the score of a projectile hit on any given one of a set of different targets of the type having a plurality of scoring areas of different scoring values where the score of a hit is determined by the value of the area in which the hit occurs, the superimposition of all of the targets forming a composite having a plurality of composite areas so located and of such size that the score of a hit thereon when one target of said set is in use would be different from that when any other target were used, said system comprising a frame having ordinate and abscissa axes defining a plane, detector means mounted on each axis, each of said detectors having a line sight sensitivity and having means responsive to a projectile passing therein for actuation of the same to produce a signal, means mounting said detector means so that a projectile piercing said plane will actuate at least one detector means on each axis with the respective displacements of the actuated detector means on either axis from the other axis being respectively the ordinate and abscissa of the pierce, each of said targets adapted to be mounted in said frame so that a projectile hitting the target will pierce the plane with the ordinate and abscissa of the hit being proportional to that of said pierce, a movable ordinate indicator responsive to a signal from the actuated detector means on said ordinate axis for movement through a first displacement proportional to the magnitude of said ordinate, a movable abscissa indicator responsive to a signal from the actuated detector means on said abscissa axis for movement through a second displacement proportional to the magnitude of said abscissa, a surface have a replica of said composite areas thereon, each of the replica areas being conductive but insulated from each other, means conductively connected with each individual replica area and adapted to respectively connect the same to actuatable indicators whose values correspond to the values of the composite areas represented by the respective replica areas, a plurality of conductors corresponding in number to the number of detector means on said abscissa axis engaged with said replica areas in a line of contacts which are a replica of the detectors on said abscissa axis, means mounting said surface and said conductors for relative movement therebetween, means responsive to the displacement of said ordinate indicator for positioning said line of contacts on said replica areas in a line corresponding to the line of sight of the actuated detector means on said ordinate axis, and means responsive of the displacement of said abscissa indicator for connecting the contactor corresponding to the actuated detector means on said abscissa axis to a power source whereby a conductive path is established from said power source to the actuatable indicator whose value corresponds to the value of the hit on the target.

References Cited in the file of this patent

UNITED STATES PATENTS

| | | |
|---|---|---|
| 966,361 | Rose | Aug. 2, 1910 |
| 2,113,899 | Oram | Apr. 12, 1938 |
| 2,269,256 | Eakins | Jan. 6, 1942 |
| 2,342,245 | Bruce et al. | Feb. 22, 1944 |
| 2,362,473 | Dunham | Nov. 14, 1944 |
| 2,438,825 | Roth | Mar. 12, 1948 |
| 2,825,569 | Alvarez | Mar. 4, 1958 |
| 2,838,694 | Hider | June 10, 1958 |
| 2,900,521 | Eames | Aug. 18, 1959 |

FOREIGN PATENTS

| | | |
|---|---|---|
| 701,935 | Great Britain | Jan. 6, 1954 |